(12) United States Patent
Inoue et al.

(10) Patent No.: US 7,393,606 B2
(45) Date of Patent: Jul. 1, 2008

(54) SEAL STRUCTURE FOR FUEL CELL SEPARATOR

(75) Inventors: Tomohiro Inoue, Fujisawa (JP); Shigeru Watanabe, Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 11/141,191

(22) Filed: Jun. 1, 2005

(65) Prior Publication Data

US 2006/0035134 A1 Feb. 16, 2006

(30) Foreign Application Priority Data

Jul. 2, 2003 (JP) ............................. 2003-190094
Jun. 24, 2004 (EP) ................................ 04014787

(51) Int. Cl.
*H01M 2/02* (2006.01)

(52) U.S. Cl. ........................................... 429/34; 429/35

(58) Field of Classification Search .................. 429/30, 429/34, 35, 36, 38, 12, 13
See application file for complete search history.

(56) References Cited

U.S. PATENT DOCUMENTS 6,846,590 B2 * 1/2005 Nishiyama et al. ............ 429/35

2002/0081477 A1 * 6/2002 McLean et al. ............... 429/34

\* cited by examiner

*Primary Examiner*—Stephen Kalafut
*Assistant Examiner*—Monique Wills
(74) *Attorney, Agent, or Firm*—Jacobson Holman PLLC (57) ABSTRACT

A seal structure of separator for fuel cell comprising:

two separators disposed opposite to one another, which have electrode portions, manifold portions circulating fuel gas fed to said electrode portions, passage grooves feeding fuel gas between said electrode portion and said manifold portion, and hole portions opposite to the manifold portions of a facing separator;

a seal body, which is provided integrally on the separators and has a first seal portion to seal an area surrounding the electrode, the passage groove and the manifold portion, and a second seal portion to independently seal the hole portion;

an electrolyte membrane, sandwiched between the two separators, having a size enough to include the electrode portion, the manifold portion and the hole portion, and having a shape with a through-hole on the manifold portion and at a portion of the hole portion; and a gasket surrounding the manifold portion of the separators and straddling the passage groove to enable fuel gas to be distributed.

1 Claim, 7 Drawing Sheets

SEAL STRUCTURE FOR FUEL CELL SEPARATOR

BACKGROUND OF THE INVENTION

1. Filed of the Invention

The present invention concerns a seal structure for fuel cell separators, has the purpose of preventing fuel gas from leaking and would be used especially in the case of integration of the seal body in the separator.

2. Description of the Related Art

Figure 5:
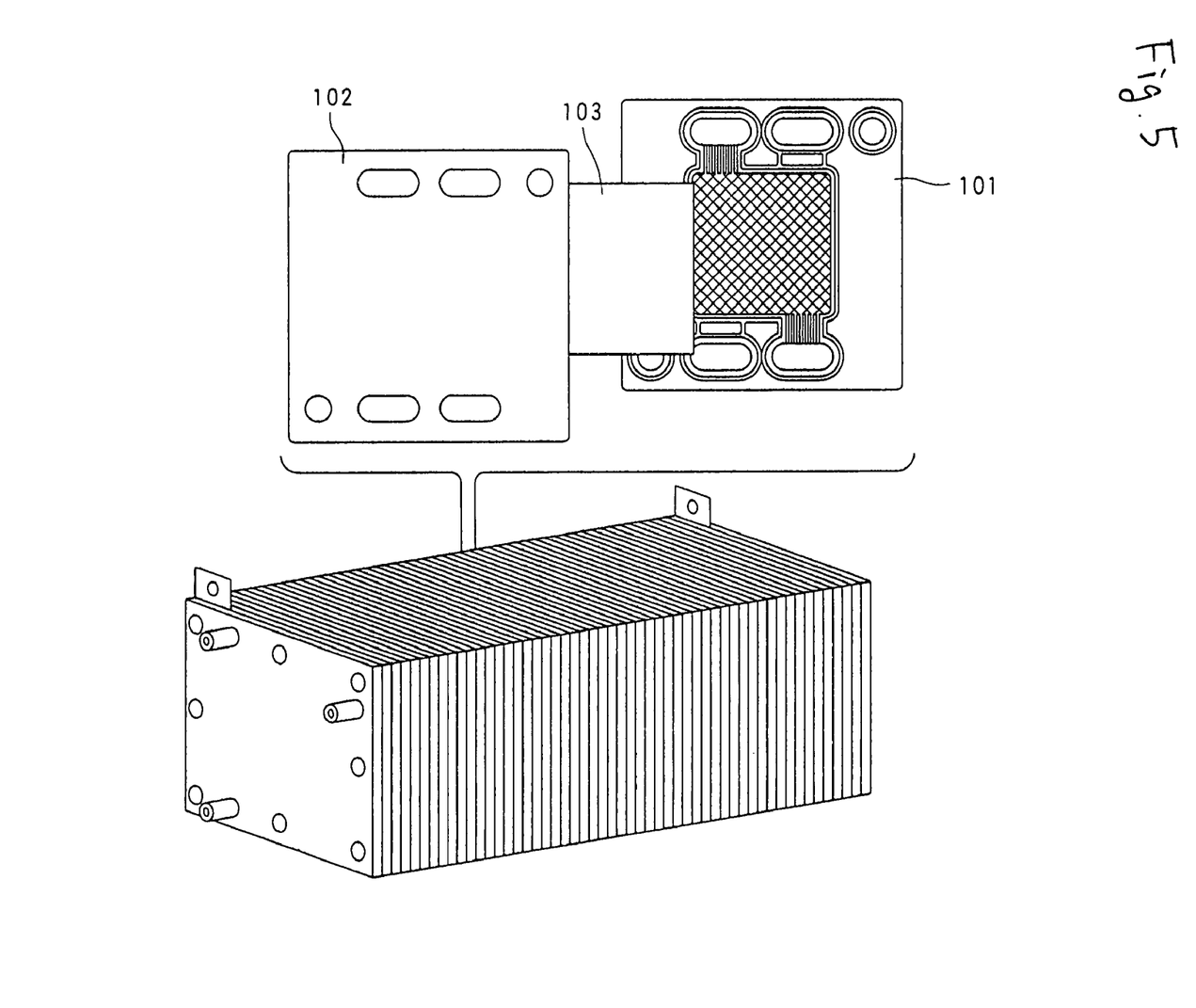
FIG. 5 shows a structure of a cell for a fuel cell.

With a view to reduction of the number of manufacturing steps and cost, constitution of the cell of a fuel cell by integrating beforehand a seal rubber for preventing leakage of fuel gas in separators and sandwiching an electrolyte membrane 103 with two separators 101, 102 as shown in FIG. 5 has been conceived.

Figure 6:
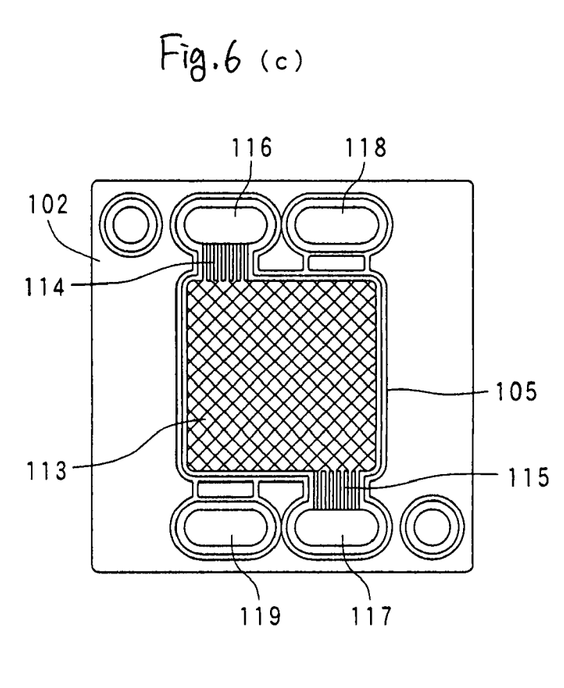
FIG. 6(a) is a plan view showing a separator according to the conventional art.
FIG. 6(b) is a plan view showing an electrolyte membrane according to the conventional art.
FIG. 6(c) is a plan view showing a separator according to the conventional art.

FIG. 6 shows two separators 101, 102 and the electrolyte membrane 103 composing a single cell, and both separators 101, 102 are shown on their side opposed to the electrolyte membrane 103 with integrally provided seal rubbers 104, 105.

In FIG. 6, the continuous seal rubber 104 sealing an area surrounding an electrode 106, passage grooves 107, 108 and manifolds 109, 110, and sealing independently holes 111, 112 is integrated with the separator 101. On the other hand, the continuous seal rubber 105 sealing an area surrounding an electrode 113, passage grooves 114, 115 and manifolds 115, 117 and sealing independently holes 118, 119 is integrated with the separator 102.

The cell for the fuel cell is composed by sandwiching the electrolyte membrane 103 of a size larger than the illustrated electrodes 106, 113 between these seal rubbers 104, 105 integrated respectively with two separators 101, 102, and arranging the faces of the separators 101, 102 integrated with the seal rubbers 104, 105 face to face with each other.

Figure 7:
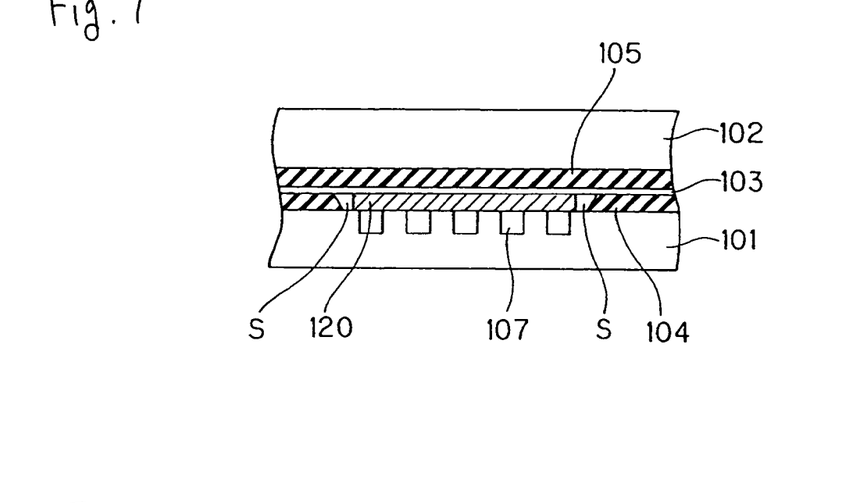
FIG. 7 is a cross section view showing essential parts of a seal structure of the fuel cell separator according to the conventional art.

Here, as shown in FIG. 7 illustrating a cross section view of FIG. 6 B-B, where the electrolyte membrane 103 is sandwiched between the separators 101, 102, the sealing is realized by bringing a spacer 120 and the seal rubber 105 into contact with the electrolyte membrane 103, and by arranging the spacer 120 across the passage groove 107, which allows compression of the seal rubber 105 by the spacer 120 because there is no seal rubber 104 for the passage groove 107 portion connecting the electrode 106 and the manifold 109.

Figure 8:
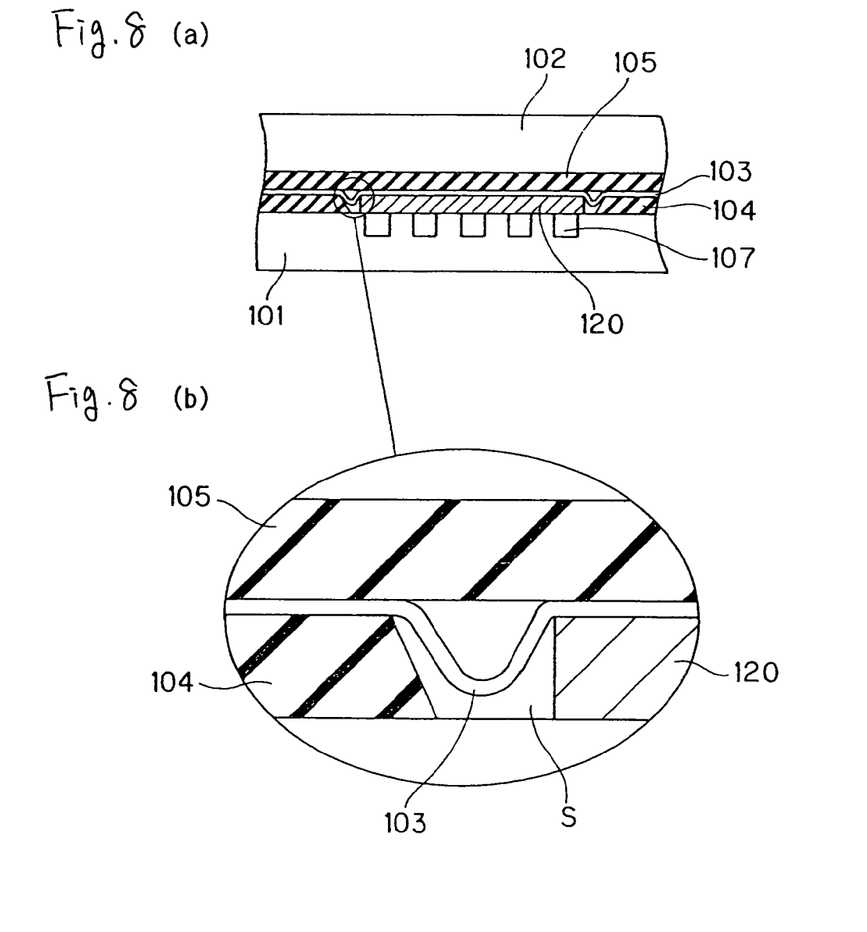
FIG. 8 is a cross section view showing problems of the seal structure of the fuel cell separator according to the conventional art.

However, the spacer 120 cannot be arranged continuously with the seal rubber 104, a certain gap S is inevitably formed between the spacer 120 and the seal rubber 104. The presence of this gap S, as shown in FIG. 8, allows the electrolyte membrane 103 to enter the space S, and the seal rubber 105 and the electrolyte membrane 103 were separated from each other, so that sealing is not established, resulting in leakage of fuel gas.

SUMMARY OF THE INVENTION

The present invention devised in view of the aforementioned conventional art. Its object is provide a seal structure for fuel cell separators which will exhibit a secured sealing exempt from leakage of fuel gas.

In order to achieve the aforementioned object, the present invention is characterized by comprising:

two separators disposed opposite to one another, which have electrode portions, manifold portions circulating fuel gas fed to said electrode portions, passage grooves feeding fuel gas between said electrode portion and said manifold portion, and hole portions opposite to the manifold portions of a facing separator;

a seal body, which is provided integrally on said separators and has a first seal portion to seal an area surrounding the electrode portion, the passage grooves and the manifold portions, and a second seal portion to seal independently said hole portion;

an electrolyte membrane, sandwiched between said two separators, of a size large enough to include said electrode portion, said manifold portion and said hole portion, and of a shape with a through-hole at the positions of the manifold portion and the hole portion; and a gasket surrounding the manifold portion of the separators and straddling said passage groove to enable fuel gas to communicate.

Therefore, the gasket surrounding the manifold portion of the separators on one hand and the second seal portion for sealing independently the hole portion in the seal body of the separators on the other hand face each other and compress each other all around the manifold portion and the hole portion, the gasket and the second seal portion of the seal body come into contact closely with the electrolyte membrane, exhibit a stable sealing and prevent the fuel gas from leaking.

DESCRIPTION OF THE PREFERRED EMBODIMENTS

Next, referring to the drawings, best embodiments of the present invention shall be described in detail as illustrative example.

Figure 1A:
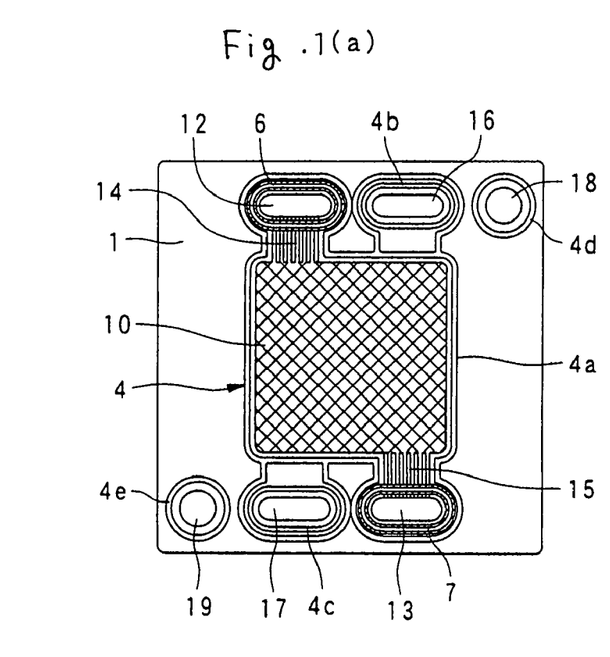
FIG. 1(a) is a plan view showing a separator according to an embodiment of the present invention.
Figure 1B:
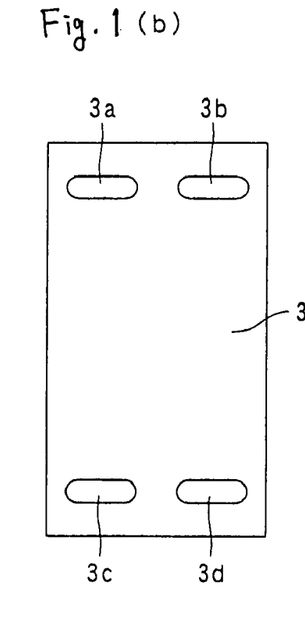
FIG. 1(b) is a plan view showing an electrolyte membrane according to the embodiment.
Figure 1C:
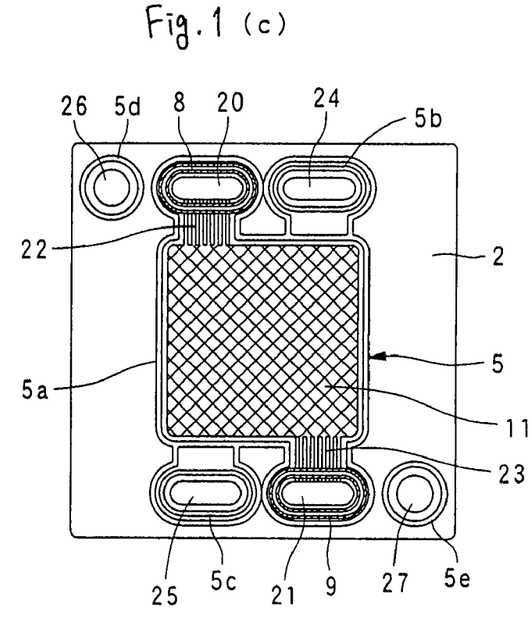
FIG. 1(c) is a plan view showing a separator according to the embodiment.
Figure 2:
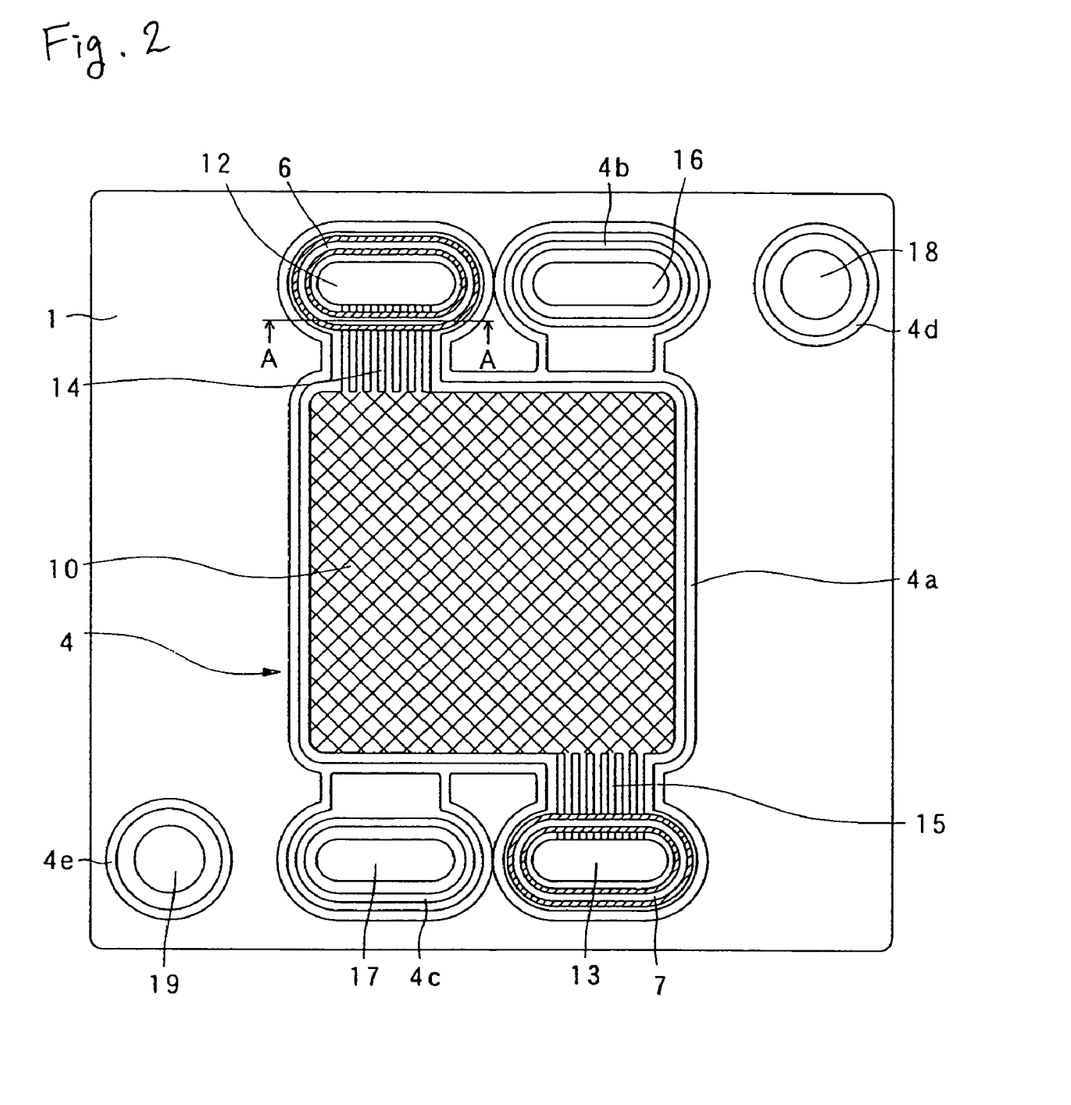
FIG. 2 is an enlarged plan view showing the separator according to the embodiment of FIG. 1(a).
Figure 3:
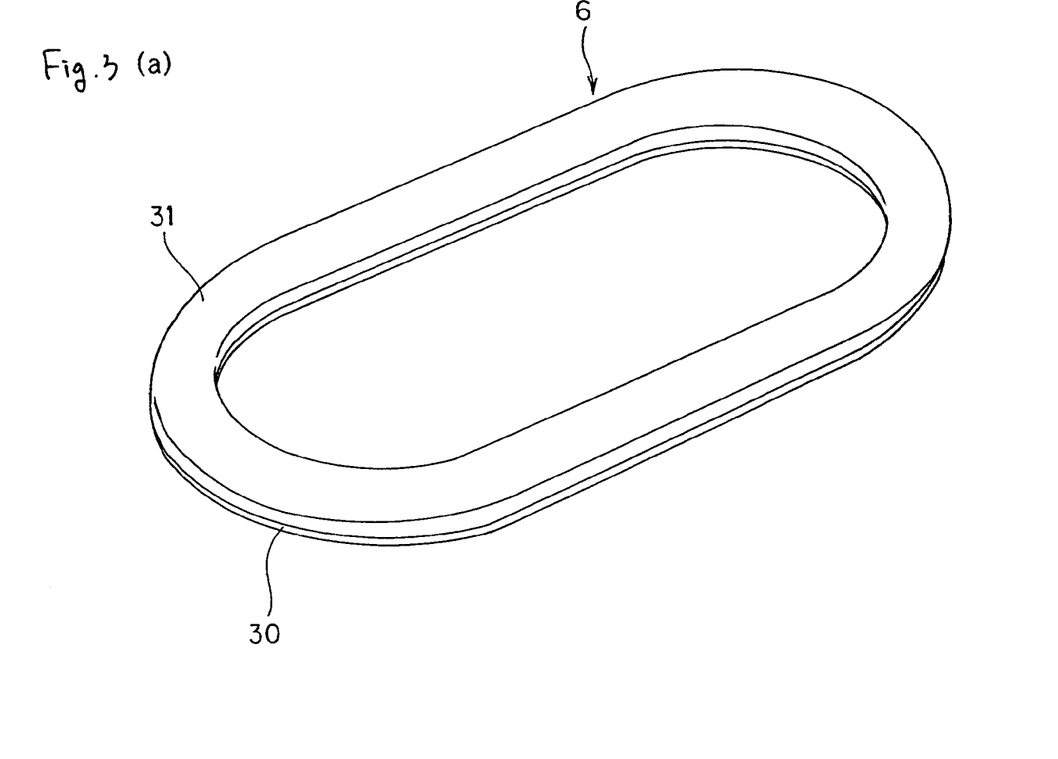
FIG. 3(a) is a perspective view showing a gasket according to the embodiment.
FIG. 3(b) is a plan view showing the gasket according to the embodiment.
Figure 4:
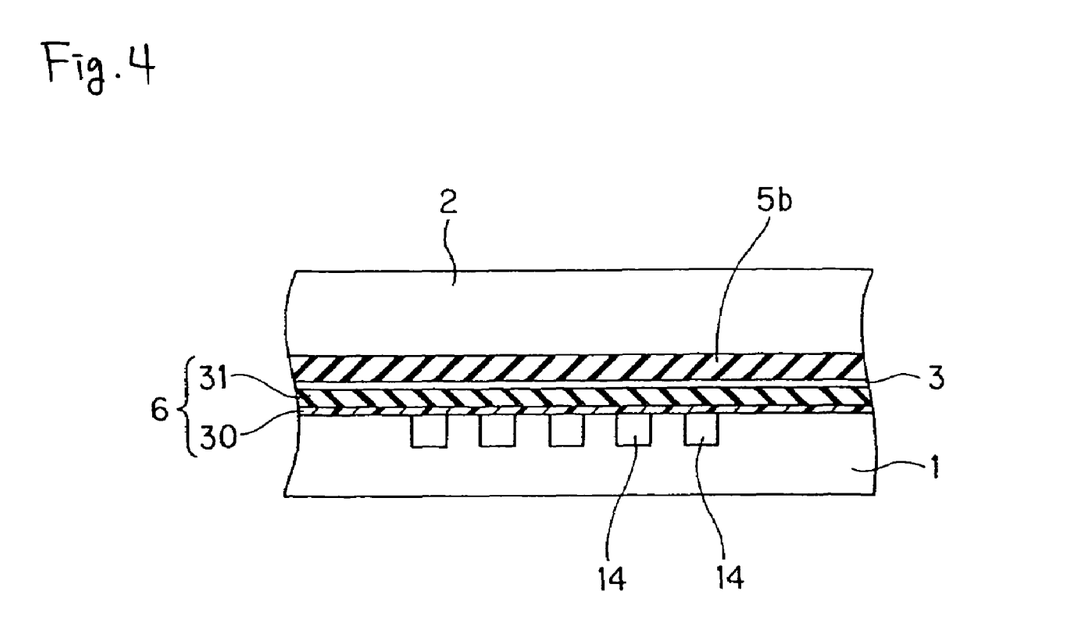
FIG. 4 is a cross section view showing essential parts of a seal structure for fuel cell separator according to the embodiment.

Referring to FIG. 1 to FIG. 5, the seal structure for the fuel cell separators according to the embodiment shall be described. FIG. 1 shows respective members used for a single cell of the fuel cell separators according to the embodiment. FIG. 2 shows one of separators for the fuel cell according to the embodiment shall be described. FIG. 3 shows a gasket of the seal structure of the fuel cell separators according to the embodiment. FIG. 4 is a cross section view showing the sealing state of the fuel cell separators according to the embodiment.

The seal structure for the fuel cell separators according to the present embodiment is used in case of composing a cell for a fuel cell by sandwiching an electrolyte membrane with two separators similarly to the conventional art shown in FIG. 5.

The seal structure for the fuel cell separators according to the present embodiment is composed of two separators 1, 2, an electrolyte membrane 3 sandwiched between the separators 1, 2, and gaskets 6, 7, 8 and 9 compressing each other, via the electrolyte membrane 3, to seal rubbers 4, 5 (seal bodies) provided integrally with respective one of the separators 1, 2.

Between two separators 1, 2, one is the separator 1 for communicating hydrogen gas (first fuel gas) to a fuel electrode 10 (electrode portion) while the other is the separator 2 for communicating oxygen gas (second fuel gas) to an air electrode 11 (electrode portion).

The separator 1 is a substantially square plate member where the square electrode 10 (electrode portion) is arranged at the center and an oval inlet manifold 12 (manifold portion) for communicating hydrogen gas to the electrode 10 and an exit manifold 13 (manifold portion) are provided across the electrode 10.

Plural passage grooves 14, 15 carved in parallel in the separator 1 for flowing hydrogen gas are formed respectively between the electrode 10 and the inlet manifold 12 and between the electrode 10 and the exit manifold 13.

Moreover, holes 16, 17 (hole portions) which allow oxygen gas to pass through, in such a manner that they face the inlet manifold 20 and the exit manifold 21 of the opposed other separator 2 when the separators 1, 2 are placed oppositely each other, are formed in the separator 1. The holes 16, 17 have the same shape as the inlet manifold 20 and the exit manifold 21.

Further, holes 18, 19 for cooling water are formed respectively at two corners on one diagonal of the separator 1, for passing cooling water.

Furthermore, the separator 2 is a substantially square plate member equal to the separator 1, where the square electrode 11 (electrode portion) is arranged at the center and the oval inlet manifold 20 (manifold portion) for communicating oxygen gas to the electrode 11 and the exit manifold 21 (manifold portion) are provided across the electrode 11.

Plural passage grooves 22, 23 carved in parallel in the separator 2 for communicating oxygen gas are formed respectively between the electrode 11 and the inlet manifold 20 and between the electrode 11 and the exit manifold 21.

Moreover, holes 24, 25 (hole portions) which allow hydrogen gas to pass through, in such a manner that they face the inlet manifold 12 and the exit manifold 13 of the opposed other separator 1 when separators 1, 2 are placed oppositely each other, are formed in the separator 2. The holes 24, 25 have the same shape as the inlet manifold 12 and the exit manifold 13.

Further, holes 26, 27 for cooling water are formed respectively at two corners on one diagonal of the separator 2, for passing cooling water.

Besides, each separator 1, 2 is integrally provided with seal rubbers 4, 5 for sealing respective circulating gases. The seal rubbers 4, 5 are integrated by using injection molding, compression molding, transfer molding, screen printing, dispenser method and so on.

The seal rubber 4 comprises a first seal portion 4a to seal an area surrounding the electrode 10, the passage grooves 14, 15, the inlet manifold 12 and the exit manifold 13, second seal portions 4b, 4c to seal independently the holes 16, 17 and third seal portions 4d, 4e to seal independently the holes 18, 19 for cooling water. The first seal portion 4a surrounds also the periphery of the second seal portions 4b, 4c separately, and the holes 16, 17 are surrounded doubly with the seal rubber 4.

Moreover, the seal rubber 5 comprises a first seal portion 5a to seal an area surrounding the electrode 11, the passage grooves 22, 23, the inlet manifold 20 and the exit manifold 21, second seal portions 5b, 5c to seal independently the holes 24, 25 and third seal portions 5d, 5e to seal independently the holes 26, 27 for cooling water. The first seal portion 5a surrounds also the periphery of the second seal portions 5b, 5c separately, and the holes 24, 25 are surrounded doubly with the seal rubber 5.

The electrolyte membrane 3 is the one to be sandwiched between the two separators 1, 2. The electrolyte membrane 3 is a rectangular sheet having a size, though smaller than the whole area of the separators 1, 2, enough to include the electrodes 10, 11, the inlet manifolds 12, 20, the exit manifolds 13, 21 and the holes 16, 17, 24, 25, and through-holes 3a to 3d are opened at the position where the inlet manifolds 12, 20, the exit manifolds 13, 21 and the holes 16, 17, 24, 25 face each other. The electrolyte membrane 3 is not sandwiched between the separators 1, 2 at the position of holes for cooling water 18, 19, 26, 27.

The gaskets 6, 7, 8, 9 are already attached to the separators 1, 2 in FIG. 1 or FIG. 2 and surrounds independently the periphery of respective one of the inlet manifolds 12, 20 and the exit manifolds 13, 21 in FIG. 3. The gaskets 6, 7, 8, 9 are placed inside the surrounding of the inlet manifolds 12, 20 and the exit manifolds 13, 21 by the first seal portions 4a, 5a of the seal rubbers 4, 5. The gasket 6 is shown in FIG. 3 as representative, and the gasket 6 is manufactured with a unit member as shown in FIG. 3(a) and adhered in a way to surround the inlet manifold 12, inside the surrounding of the inlet manifold 12 by the first seal portion 4a of the seal rubber 4 as shown in FIG. 3(b).

Passage grooves 14, 15, 22, 23 communicating with the electrodes 10, 11 exist around the inlet manifolds 12, 20 and the exit manifolds 13, 21, the gaskets 6, 7, 8, 9 straddle like bridges the upper part of the plural passage grooves 14, 15, 22, 23 arranged in parallel, and concave portions carved in the separators 1, 2 of the passage grooves 14, 15, 22, 23 allows communicating respective circulation gas.

The gaskets 6, 7, 8, 9 are the ones, as the gasket 6 shown in FIG. 3 representatively, to be formed separately from the separators 1, 2 and comprises a substrate 30 of resin film, carbon plate or the like to impart such rigidity necessary for straddling over the passage grooves 14, 15, 22, 23 and a rubber portion 31 integrated with the substrate 30. For the integration of the substrate 30 and the rubber portion 31, adhesion by an adhesive or a selective adhesion rubber is used.

The resin film used for the substrate 30 of the gaskets 6, 7, 8, 9 includes PET (polyethyleneterephthalate), PEN (polyethylenenaphthalate), PI (polyimide), PPS (poly phenylene sulfide) and so on, and PI is preferable among others.

It should be appreciated that the gaskets 6, 7, 8, 9 may comprise only the substrate 30, because the substrate 30 can seal alone.

As for the adhesion of the gaskets 6, 7, 8, 9 to the separators 1, 2, pressure-sensitive adhesive is applied to the substrate 30 to adhere and fix it to the separators 1, 2. In case where the pressure-sensitive adhesive is not used, projections are provided on the separators 1, 2, holes engaging with the projections are formed in the substrate for joining the gaskets 6, 7, 8, 9 with the separators 1, 2 or other methods may be adopted.

A single cell is then formed by sandwiching the electrolyte membrane 3 between two separators 1, 2 to which the gaskets 6, 7, 8, 9 are adhered.

FIG. 4 is a cross section view showing essential parts sealed with the gasket 6 by sandwiching the electrolyte membrane 3 between the separators 1, 2 at the A-A portion in FIG. 2. In FIG. 4, the second seal portion 5*b* of the seal rubber 5 surrounding the hole 24 of the separator 2 is opposed, via the electrolyte membrane 3, to the gasket 6 straddling on the passage groove 14 of the separator 1 and at the same time surrounding the inlet manifold 12 and the gasket 6 and the second seal portion 5*b* compress each other all around the periphery.

As mentioned hereinabove, the gaskets 6, 7, 8, 9 surround respectively all around the periphery of the inlet manifolds 12, 20 and the exit manifolds 13, 21, and the seal rubbers 4, 5 and the gaskets 6, 7, 8, 9 come always in a close contact with the electrolyte membrane 3 around the inlet manifolds 12, 20, the exit manifolds 13, 21 and the holes 16, 17, 24, 25 and can exhibit a better sealing, because it is unnecessary to change members opposed to the seal rubbers 4, 5 on the passage groove and the other part, while it is necessary to change them between on the passage groove and the other part in the conventional art.

As mentioned hereinabove, the present invention can exhibit a secure sealing, without leakage of fuel gas.

The invention claimed is:

1. A seal structure for fuel cell separators on each of which seal portions are provided integrally, said seal structure comprising:
   a first separator having an electrode portion in communication with a first fuel gas, manifold portions circulating the first fuel gas to said electrode portion, passage grooves feeding the first fuel gas between said electrode portion and said manifold portions, and further including hole portions;
   a second separator facing said first separator, said second separator having an electrode portion in communication with a second fuel gas, manifold portions circulating the second fuel gas to said electrode portion, passage grooves feeding the second fuel gas between said electrode portion and said manifold portions, and hole portions opposite to the manifold portions of the first separator;
   a first seal portion to seal an area surrounding said electrode portion, said passage grooves and said manifold portions of each of said first separator and said second separator, respectively;
   a second seal portion provided independently from the first seal portion to seal independently said hole portions of each of said first separator and said second separator, respectively;
   an electrolyte membrane sandwiched between said first separator and said second separator, said electrolyte membrane being of a size large enough to simultaneously cover said electrode portion, said manifold portions and said hole portions of said first separator and said second separator, and said electrolyte membrane having through-holes at respective positions of said manifold portions and said hole portions of said first separator and said second separator; and
   a first gasket surrounding said manifold portions of said first separator and straddling said passage grooves of said first separator to enable the first fuel gas to communicate with said electrode portion and said manifold portions of said first separator, and sandwiching said second seal portion of said second separator to seal all around a periphery of said hole portions of said second separator; and
   a second gasket surrounding said manifold portions of said second separator, straddling said passage grooves of said second separator to enable the second fuel gas to communicate with said electrode portion and said manifold portions of said second separator, and sandwiching said second seal portion of said first separator to seal all around a periphery of said hole portions of said first separator.

* * * * *